United States Patent
Luo et al.

(10) Patent No.: US 9,315,939 B2
(45) Date of Patent: Apr. 19, 2016

(54) SHAPED MONOFILAMENTS WITH GROOVES AND THE FABRICS MADE THEREOF

(75) Inventors: Shuiyuan Luo, Rochester Hills, MI (US); Alan Billings, Clifton Park, NY (US); Michael Josef, Clifton Park, NY (US)

(73) Assignee: Albany International Corp., Albany, NY (US)

( * ) Notice: Subject to any disclaimer, the term of this patent is extended or adjusted under 35 U.S.C. 154(b) by 1858 days.

(21) Appl. No.: 10/540,725

(22) PCT Filed: Dec. 19, 2003

(86) PCT No.: PCT/US03/40529
§ 371 (c)(1),
(2), (4) Date: Mar. 16, 2007

(87) PCT Pub. No.: WO2004/061168
PCT Pub. Date: Jul. 22, 2004

(65) Prior Publication Data
US 2007/0270068 A1    Nov. 22, 2007

Related U.S. Application Data

(63) Continuation-in-part of application No. 10/334,513, filed on Dec. 31, 2002, now abandoned.

(51) Int. Cl.
*D02G 3/22* (2006.01)
*D21F 7/08* (2006.01)
(Continued)

(52) U.S. Cl.
CPC .............. *D21F 1/0027* (2013.01); *D01D 5/253* (2013.01); *D02G 3/22* (2013.01); *D02G 3/447* (2013.01);
(Continued)

(58) Field of Classification Search
CPC ......... D01D 5/253; D02G 3/22; D02G 3/447; D03D 15/0083; D03D 15/0088; B32B 2255/02
USPC .......... 442/189, 192, 193, 195, 301; 428/395, 428/400
See application file for complete search history.

(56) References Cited

U.S. PATENT DOCUMENTS

| 5,141,811 A | 8/1992 | Kawakami et al. |
| 5,360,808 A | 11/1994 | Englert et al. |

(Continued)

FOREIGN PATENT DOCUMENTS

| CA | 2 388 568 A | 3/2001 |
| EP | 0995835 | 4/2000 |

(Continued)

OTHER PUBLICATIONS

"Stagger." Merriam-Webster.com. Merriam-Webster, n.d. Web. Aug. 25, 2014. <http6://www.merriam-webster.com/dictionary/stagger>.*

*Primary Examiner* — Jenna Johnson
(74) *Attorney, Agent, or Firm* — Frommer Lawrence & Haug LLP

(57) ABSTRACT

A monofilament with longitudinally oriented grooves and fabrics made thereof having reduced air permeability, wherein the reduced permeability is achieved without using additional coatings or stuffer yarns. Bicomponent monofilaments made from these grooved monofilaments using solution or wire coating have improved coating adhesion and may also include a conductive coating. In addition, the grooved bicomponent monofilaments may include a wear-indicating mechanism. Also disclosed are monofilaments with grooves formed in its surfaces. Advantageously, these grooved monofilaments exhibit improved adhesion to "sheet-grip" coatings, as compared with circular monofilaments. In addition, fabrics comprising these grooved monofilaments demonstrate improved air handling. The grooved monofilaments may be incorporated in a fabric as MD yarns, CD yarns, or both CD and MD yarns.

26 Claims, 5 Drawing Sheets

(51) Int. Cl.
  *D01D 5/253* (2006.01)
  *D21F 1/00* (2006.01)
  *D02G 3/44* (2006.01)
(52) U.S. Cl.
  CPC *D21F 7/08* (2013.01); *D21F 7/083* (2013.01); *B32B 2255/02* (2013.01); *Y10T 428/2929* (2015.01); *Y10T 428/2936* (2015.01); *Y10T 442/3146* (2015.04); *Y10T 442/611* (2015.04); *Y10T 442/637* (2015.04); *Y10T 442/638* (2015.04)

(56) References Cited

U.S. PATENT DOCUMENTS

| | | | |
|---|---|---|---|
| 5,617,903 A | | 4/1997 | Bowen, Jr. |
| 5,925,434 A | * | 7/1999 | Phillips et al. ............ 428/95 |
| 5,985,450 A | | 11/1999 | Keller |
| 5,998,310 A | | 12/1999 | Bowen, Jr. |
| 6,090,475 A | | 7/2000 | Robinson et al. |
| 6,093,491 A | | 7/2000 | Dugan et al. |
| 6,171,446 B1 | | 1/2001 | Diaz-Kotti |
| 6,352,772 B1 | | 3/2002 | Keller |
| 6,548,166 B2 | | 4/2003 | Figuly et al. |
| 6,766,817 B2 | | 7/2004 | da Silva |
| 2003/0068948 A1 | * | 4/2003 | Smith et al. ............ 442/189 |
| 2003/0148687 A1 | | 8/2003 | Korfer et al. |
| 2003/0163884 A1 | | 9/2003 | Weihrauch |
| 2003/0232557 A1 | | 12/2003 | Korfer |
| 2004/0127127 A1 | * | 7/2004 | Eagles ............ 442/195 |
| 2004/0261883 A1 | | 12/2004 | Harrison |

FOREIGN PATENT DOCUMENTS

| | | |
|---|---|---|
| EP | 133 120 A | 8/2003 |
| EP | 1 214 469 B | 1/2004 |
| EP | 1 507 039 A | 2/2005 |
| JP | 09-157985 | 6/1997 |
| WO | WO 94/10539 | 5/1994 |
| WO | WO 02/03831 | 1/2002 |

* cited by examiner

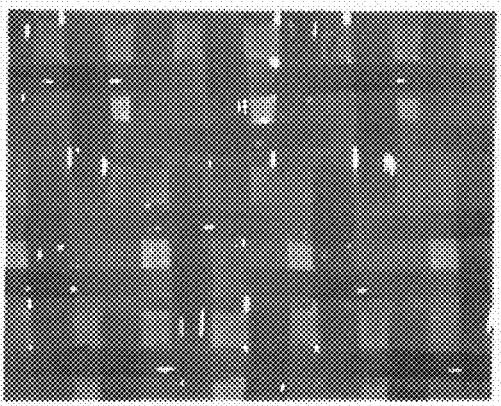
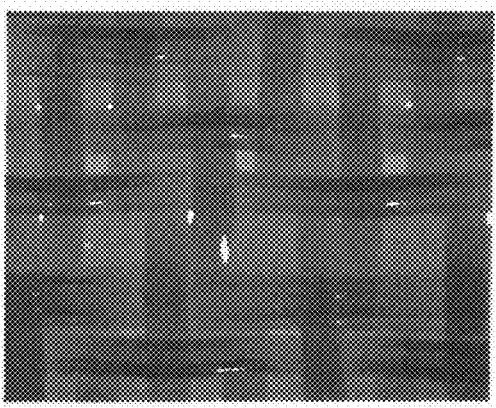
FIG. 4A  FIG. 4B
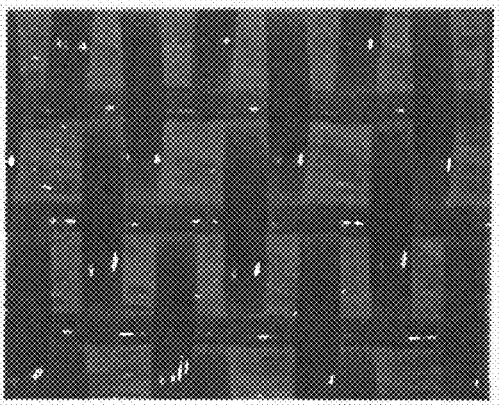
FIG. 4C  FIG. 4D

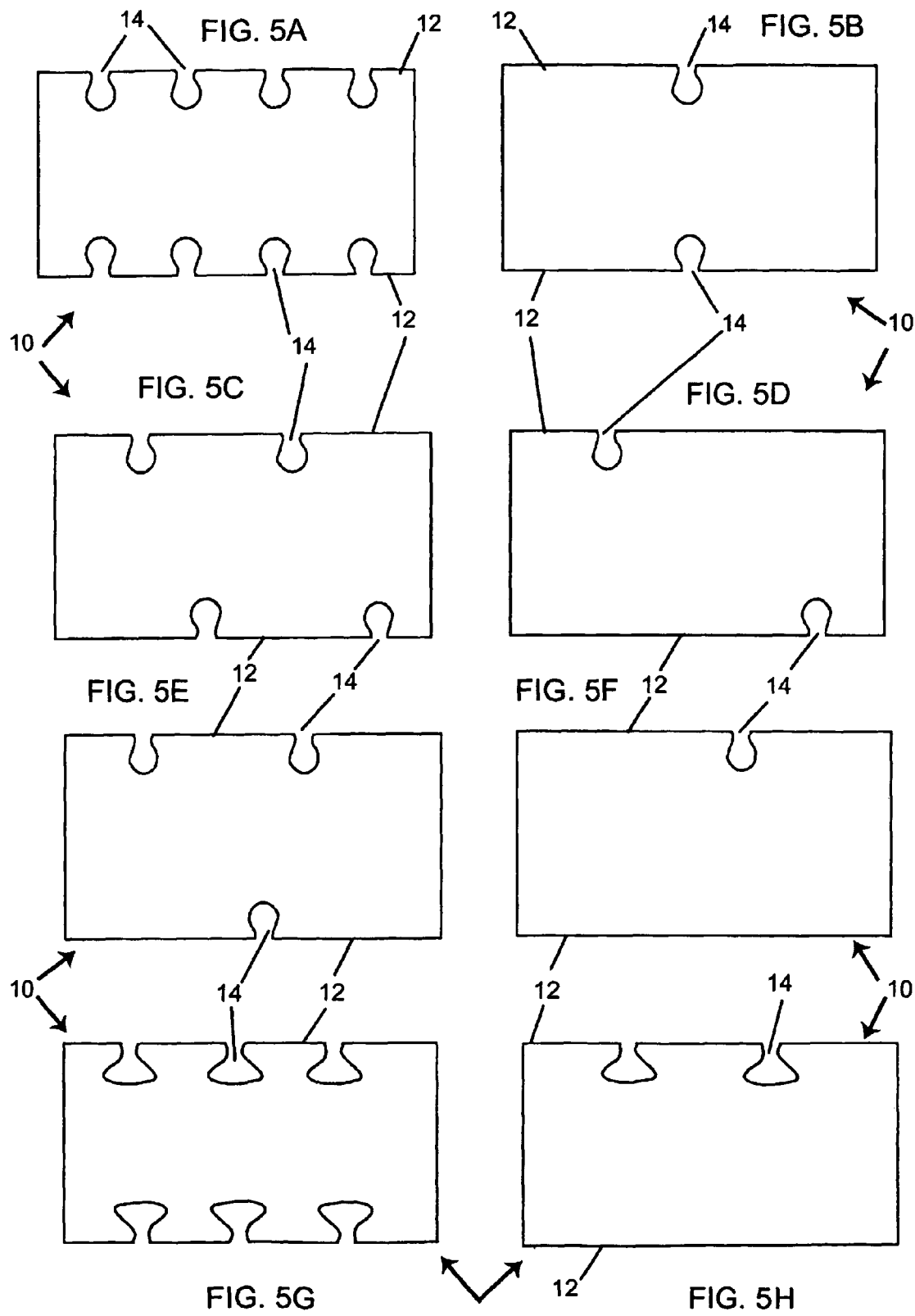

SHAPED MONOFILAMENTS WITH GROOVES AND THE FABRICS MADE THEREOF

This application is a 371 of PCT/US2003/040529 filed on Dec. 19, 2003, published on Jul. 22, 2004 under publication number WO 04/061168 A2 and claims continuation-in-part priority benefits from U.S. patent application Ser. No. 10/334,513 filed on Dec. 31, 2002, now abandoned.

BACKGROUND OF THE INVENTION

1. Field of the Invention

The present invention relates to shaped yarns and industrial fabrics. More specifically, the present invention relates to using yarns with longitudinally oriented grooves to reduce fabric permeability without the need of an additional coating or stuffer yarns. These yarns can also be bicomponent yarns with improved coating adhesion, or bicomponent yarns with a wear-indicating mechanism. The invention also relates to grooved yarns that exhibit increased coating adhesion whilst providing improved sheet and air handling in fabrics.

2. Description of the Prior Art

During the papermaking process, a cellulosic fibrous web is formed by depositing a fibrous slurry, that is, an aqueous dispersion of cellulose fibers, onto a moving forming fabric in the forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speeds. That is to say, the fibrous slurry is continuously deposited onto the forming fabric in the forming section, while a newly manufactured paper sheet is continuously wound onto rolls after it exits from the dryer section.

Contemporary papermaking fabrics are produced in a wide variety of styles designed to meet the requirements of the paper machines on which they are installed for the paper grades being manufactured. Generally, they comprise a woven base fabric. The base fabrics may be woven from monofilament, plied monofilament, multifilament or plied multifilament yarns, and may be single-layered, multi-layered or laminated. The yarns are typically extruded from any one of the synthetic polymeric resins, such as polyamide and polyester resins, used for this purpose by those of ordinary skill in the paper machine clothing arts.

The woven base fabrics themselves take many different forms. For example, they may be woven endless, or flat woven and subsequently rendered into endless form with a woven seam. Alternatively, they may be produced by a process commonly known as modified endless weaving, wherein the widthwise edges of the base fabric are provided with seaming loops using the machine-direction (MD) yarns thereof. In this process, the MD yarns weave continuously back-and-forth between the widthwise edges of the fabric, at each edge turning back and forming a seaming loop. A base fabric produced in this fashion is placed into endless form during installation on a paper machine, and for this reason is referred to as an on-machine-seamable fabric. To place such a fabric into endless form, the two widthwise edges are brought together, the seaming loops at the two edges are interdigitated with one another, and a seaming pin or pintle is directed through the passage formed by the interdigitated seaming loops.

Further, the woven base fabrics may be laminated by placing at least one base fabric within the endless loop formed by another, and by needling a staple fiber batt through these base fabrics to join them to one another. One or more of these woven base fabrics may be of the on-machine-seamable type. This is now a well known laminated press fabric with a multiple base support structure.

In any event, the woven base fabrics are in the form of endless loops, or are seamable into such forms, having a specific length, measured longitudinally therearound, and a specific width, measured transversely thereacross.

Turning now to the yarns used heretofore, particularly for dryer fabrics, monofilament yarns have typically been extruded with a simple circular cross-section. More recently, monofilaments with shaped cross-section have been produced. These shaped monofilaments have been used in woven fabrics to modify the fabric surface texture or density, or in particular, to control the fabric air permeability. In this connection, for example, U.S. Pat. No. 5,361,808 (Bowen) discloses using finned or T-shaped monofilaments as CD stuffer yarns to reduce air permeability. As another example, U.S. Pat. No. 5,998,310 (Bowen) shows a tri-lobal stuffer used to reduce permeability. "Y" and "X" and "T" shaped monofilaments are also described. Fabric stability at permeabilities of 200 CFM or greater using the shaped cross-machine-direction (CD) yarns is maintained. None of the prior art however, uses shaped yarns as functional yarns which reduce air permeability without using a coating and without using stuffer yarns. Nor does any of the prior art use shaped CD monofilaments for improved coating adhesion and for producing bicomponent monofilaments.

Also in connection with round MD yarns used heretofore in dryer fabrics, the fabric's sheet side has been treated with a coating that grips the paper sheet. Although the coating has sufficient abrasion resistance, there is concern that the coating will detach from the circular yarns prematurely. In addition, the fluoropolymer in the yarn and oils on its surface impeded attachment of the coating to the monofilaments. Adequate venting of moisture at the point of contact with the paper sheet, and sufficient air handling along the fabric surface have also been concerns.

SUMMARY OF THE INVENTION

The present invention uses shaped functional yarns to reduce air permeability without the need to use a coating or stuffer yarns. The shaped monofilaments are also used for improved coating adhesion and for producing bicomponent monofilaments. More specifically, groove-shaped monofilaments are used as MD yarns, CD yarns, or both MD and CD yarns, and the fabrics made thereof are disclosed herein. When the fabrics are coated or laminated, the adhesion strength, tear-resistance and other properties are improved through an interlocking mechanism regardless of the particular coating chemistry. Also bicomponent monofilaments may be made from these grooved monofilaments using solution or wire coating having improved delamination resistance and may also include a conductive coating. In addition, the bicomponent monofilaments may include a wear-indicating mechanism.

The invention also provides monofilaments having circular or non-circular cross section and grooves formed therein. Advantageously, these grooved monofilaments exhibit improved adhesion particularly to "sheet-grip" coatings. In addition, fabrics comprising these grooved monofilaments on the fabric's surface demonstrate improved air handling and reduced sheet marking. In connection with this feature, the grooves in the monofilaments channel air passing over the fabric. More specifically, the cross sectional shape of the groove can be one which provides the fabric with a desired air handling capacity, and need not be a shape which provides mechanical locking of a coating.

BRIEF DESCRIPTION OF THE DRAWINGS

FIGS. 4(b) and 4(d) are optical photomicrographs of the sheet surfaces of sample fabrics with grooved monofilaments;

FIGS. 4(a) and 4(c) are the sheet surfaces of typical prior art fabrics with circular monofilaments;

FIGS. 5(a) through 5(h) are cross-sectional views of grooved monofilaments, according to a second embodiment of the present invention.

DETAILED DESCRIPTION OF THE PREFERRED EMBODIMENTS

A first embodiment of the present invention will be described in the context of a papermaking dryer fabric. However, it should be noted that the invention is applicable to the fabrics used in other sections of a paper machine, as well as to those used in other industrial settings where surface smoothness and planarity, and controlled permeabilities to water and air are of importance. Some examples of other fabric types to which the invention is applicable include papermaker's forming and press fabrics, through-air-drying (TAD) fabrics and pulp forming fabrics. Another example is of fabrics used in related-to-papermaking-processes such as sludge filters and chemiwashers. Yet another example of a fabric type to which the invention is applicable is engineered fabrics, such as fabrics used in making non-woven textiles in the wetlaid, drylaid, meltblown and/or spunbonding processes.

Fabric constructions include woven, spiral wound, knitted, extruded mesh, spiral-link, spiral coil, and other nonwoven fabrics. These fabrics may comprise monofilament, plied monofilament, multifilament or plied multifilament yarns, and may be single-layered, multi-layered or laminated. The yarns are typically extruded from any one of the synthetic polymeric resins, such as polyamide and polyester resins, used for this purpose by those of ordinary skill in the industrial fabric arts in addition to those made of metal or other material suitable for the purpose.

Figure 1:
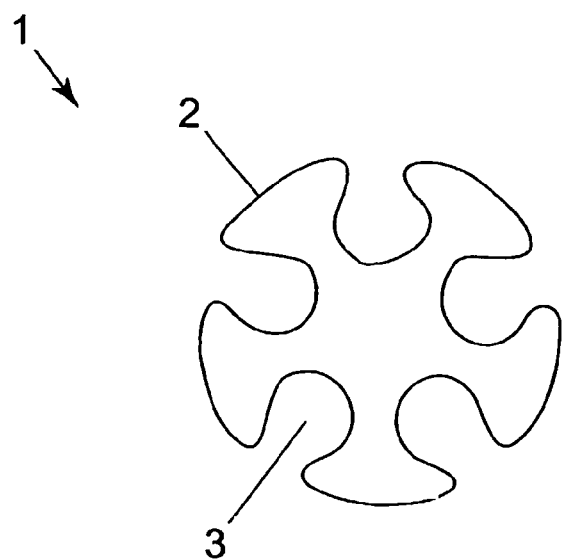
FIG. 1 is a cross-sectional view of the grooved monofilament according to a first embodiment of present invention.

As one, embodiment of the present invention, a grooved functional monofilament 1 is illustrated in FIG. 1 (cross-sectional view). Note, while a circular shape is shown, the monofilament can obviously have a different cross-sectional shape selected from one of rectangular, square, trapezoidal, oblong, oval, conical, pentalobe, star-shaped, or other non-circular shape suitable for the purpose. The monofilaments 1 may be incorporated in a fabric as functional CD yarns as compared to stuffer yarns. In addition, the monofilaments 1 can also be incorporated in a fabric as MD yarns, or as both CD and MD yarns. The surface 2 of the monofilament 1 has a plurality of grooves 3 running along the length thereof. The grooves 3 may be provided during the extrusion of the monofilament 1. While each groove 3 in FIG. 1 has a C-shaped cross-section and is preferred in certain applications, other groove shapes such as U-shaped, etc. may be used in other applications.

In the case of C-shaped grooves, note that the "open angle", which is defined as the angle at the center of the "C" and facing its outlet, is much less than 180 degrees.

In the preferred embodiment, the grooved monofilament 1 is made of a particularly tough and strong polymer such as polyester(PET), or alternatively, polyamide (PA). However, the grooved monofilament 1 can consist of another filament/fiber forming thermoplastic polymer material such as poly(phenylene sulfide)(PPS), polyetheretherketone (PEEK), poly(aryletherketone)(PEK), polyethylene(PE) or polypropylene(PP).

Figure 2A:
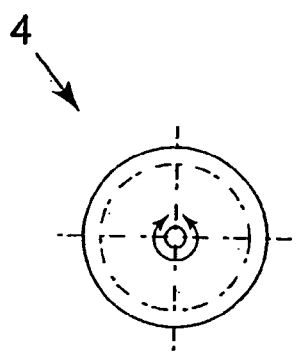
FIGS. 2A-2C illustrate a typical design for a die used to make the grooved monofilament in FIG. 1.
Figure 2B:
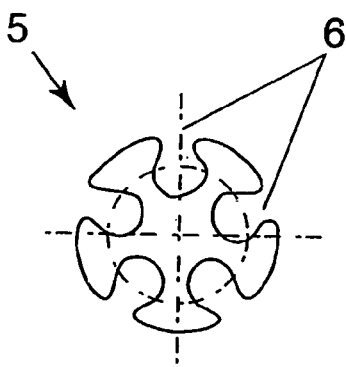
Figure 2C:
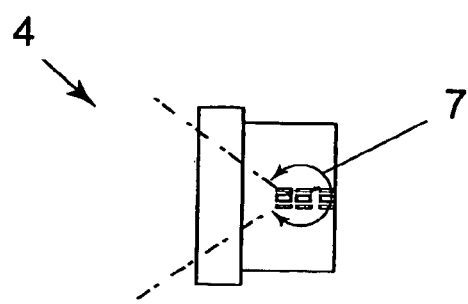

Groove-shaped PET monofilaments are typically made through melt spinning using a die (sometimes referred to as a "spinneret"), and the die design is an important factor in shape extrusion. One typical die 4 is shown in FIGS. 2A-2C. Note that the cross-section of the capillary 5 is roughly circular with five projections 6 into the interior area of the capillary 5. The projections 6 have a circular shape. The inlet angle 7, which is defined as the angle at the center of the circular shape projection and facing into the interior area of the capillary 5, is over 250 degrees. The diameter of the capillary 5 is about three times the size of the monofilaments to be produced. The ratio of length to diameter of the capillary 5 is about 3:1. Table 1 shows an example of the processing conditions for making the PET grooved monofilaments using this die 4. Note that processing conditions depend on the particular fiber-forming material used.

TABLE 1

Processing Conditions for Preparing Grooved PET Monofilaments.

| Extruder | Die | Spin Pump | Melt & Quench | Draw & Relax | Throughput | Resin |
|---|---|---|---|---|---|---|
| Single Screw Screw Size: 1.5" Screw Design: D-S. Barrier, 3D, High Work | As Shown In FIG. 1 | Size: 10 cc Speed: 3 rpm | Melt: 550-555° F. Quench: 144° F. | Draw 5 X @ 375° F. Relax 0.12 @ 400° F. | 5.28 lbs./hr | Crystar from Dupont .95 IV |

Figure 3:
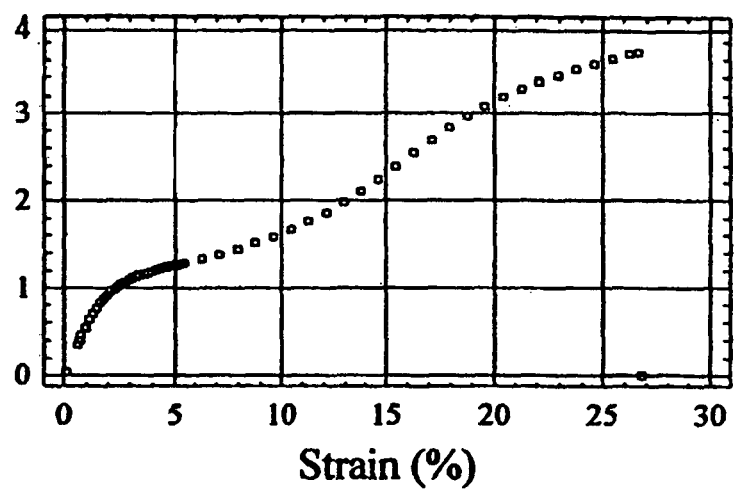
FIG. 3 shows a typical "tensile stress" vs. "strain" plot for the grooved monofilaments.

Tensile properties of the grooved PET monofilaments, prepared under the conditions in Table 1, were characterized using an Instron machine, with a crosshead speed of 10 inches per minute, and gage length of 10 inches. FIG. 3 shows a typical "tensile stress" vs. "strain" plot for these grooved PET monofilaments, and their tensile properties are detailed in Table 2.

TABLE 2

Physical and Mechanical Properties of the PET Grooved Monofilaments.

| Denier (gm/9000 m) | Diameter (mm) | Tenacity (GPD) | Break Elong. (%) | Shrinkage @200° C. (%) | Loop Strength (GPD) |
|---|---|---|---|---|---|
| 1669 | 0.55 | 3.64 | 25.0 | 11.0 | 2.87 |

The tensile properties of the grooved PET monofilaments indicated in Table 2 are comparable to those of PET monofilaments having other types of shapes. Further, by varying the processing conditions for making the grooved monofilaments, their physical and mechanical properties can be optimized for different applications.

A sample fabric was produced, being made partially of the grooved monofilaments and was woven using a monoplane weave, forcing the CD yarn (the grooved filaments) to the sheet side. Measurements taken from the sample fabric and from a typical prior art fabric having conventional circular monofilaments show that the weavability of the sample fabric was the same as the prior art fabric. FIGS. 4(b) and 4(d) are the optical photomicrographs of the sheet surfaces of the sample fabrics with the grooved monofilaments on top. FIGS. 4(a) and 4(c) are the surfaces of prior art fabrics with circular monofilaments on top. The symmetric surface of the fabric with grooved monofilaments on top was found to "look" and "feel" better than that of the fabric with circular monofilaments on top. Further, the sample fabric with grooved monofilaments on top exhibited considerably lower air permeability, e.g., 60 CFM, compared to a permeability of 103 CFM for the same style fabric with circular monofilaments on top. Advantageously, this reduced permeability is achieved without using a coating and without using stuffer yarns.

TABLE 3

Air Permeability Testing.

| filament | weave | filling (mm) | loc. | loom tension | H/S Perm. | cal. (in.) |
|---|---|---|---|---|---|---|
| grooved | 960 | 0.40 | TMB | 650 | 60 | .061 |
| circular | 960 | 0.40 | TMB | 650 | 103 | .059 |

In addition to demonstrating reduced permeability, fabrics woven partially or completely with the grooved monofilaments exhibit improved adhesion to coatings, and to laminate substrates which would be mechanically coupled together by way of, for example, a flow of thermoplastic material from a thermoplastic laminate substrate which is heated. For example, the laminate substrate may comprise bicomponent yarns which upon heating causes the melting of a portion of such yarns which flows into the grooves and which upon setting, mechanically secures the laminate substrate to the grooved monofilaments. Tear resistance is also improved. These improvements are achieved through the mechanism of mechanical interlocking and surface roughening. Moreover, these improvements are effected regardless of the coating chemistry since it includes a mechanical interlock rather than solely a surface adhesion of the coating to the monofilament.

Yet a further advantage is provided in that bicomponent monofilaments can be made from these grooved monofilaments using solution or wire coating. Compared to typical prior art sheath-core monofilaments, it is believed that the bicomponent monofilaments will have much better delamination-resistance because of mechanical interlock of the coating in the surface groove(s). One specific application of this type, for example, is the creation of conductive monofilaments made by coating the grooved core monofilaments with a conductive coating.

Figure 6:
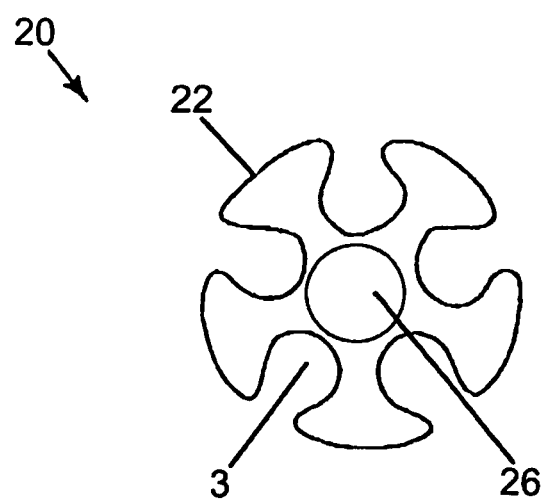
FIG. 6 is a cross-sectional view of the bicomponent grooved monofilament according to a further embodiment of present invention.

In addition, as shown in FIG. 6 (cross-sectional view), the bicomponent monofilament 20 may comprise a core 26 surrounded by a grooved sheath 22. Advantageously, the core 26 and the surrounding sheath 22 are visibly distinguishable from one another by, for example, their contrasting color. This enables the wear of fabrics comprising such monofilaments 20 to be monitored as abrasion gradually wears away the sheath 22 of the monofilaments 20, eventually revealing the different colored core 26. This will result in a change in color of the fabric or portions thereof, indicating that its useful life has or was about to end. Note, while a circular shape is shown, the bicomponent monofilament can obviously have a different cross-sectional shape suitable for the purpose.

As examples of a second embodiment of the invention, grooved monofilaments 10 are illustrated in FIGS. 5(a) to 5(h) (cross-sectional view). Note that these monofilaments 10 can be incorporated in a fabric as MD yarns, CD yarns, or both CD and MD yarns. As can be seen, either or both the top and bottom surfaces 12 of the monofilaments 10 have one or more grooves 14 running along the length thereof. The monofilaments 10 are typically die extruded from any of the materials previously discussed, and the grooves 14 may be provided during the extrusion. Further, by varying the processing conditions for making the grooved monofilaments 10, their physical and mechanical properties can be optimized for different applications. Note also that the groove-to-yarn dimensions shown in the figures are merely illustrative and not drawn to scale.

For example, the grooved monofilament 10 can have a cross-sectional shape selected from one of rectangular, square, trapezoidal, oblong, oval, conical, pentalobe, star-shaped, or other non-circular shape suitable for the purpose. As one example, the grooved monofilaments 10 in FIGS. 5(*a*) through 5(*h*) have a rectangular cross section. In addition, each groove 14 of the monofilament 10 has a cross-sectional shape that can be U-shaped, key-way shaped, C-shaped, V-shaped, square, rectangular, trapezoidal, or other shape suitable for the purpose. As one example, the grooves 14 shown in FIGS. 5(*a*) through 5(*f*) have a U-shaped cross section. As another example, the grooves 14 in FIGS. 5(*g*) and 5(*h*) have a "key-way" shaped cross section. Note that the shape of the key-way groove 14 can vary, as long as the bottom of the groove 14 is wider than the top.

As illustrated in FIGS. 5(*a*) and 5(*b*), the top surface 12 of the grooved monofilament 10 preferably has the same profile as the bottom surface 12. This makes manufacture of a woven fabric much easier since it does not matter if the grooved monofilament 10 turns over during weaving. In this connection, note that the top and bottom grooves 14 are aligned. In addition, the grooves 14 can be offset, as shown in FIG. 5(*d*), so to limit the risk of splitting of the monofilament 10.

Advantageously, the grooved monofilaments 10 exhibit improved attachment of coatings, as compared to conventional circular monofilaments. For example, a sheet-gripping coating applied to the grooved monofilaments 10 will last up to a year, as compared to coatings applied to circular yarns which may wear off in weeks. These improvements are achieved through the mechanism of mechanical interlocking and surface roughening. Moreover, these improvements are effected regardless of the coating chemistry since it includes a mechanical interlock rather than solely a surface adhesion of the coating to the grooved monofilament 10.

In connection with a further advantage provided by the present invention, note that when ungrooved flat (rectangular) yarns come in contact with a sheet (not shown), heat and consequently steam builds up (is trapped) in the sheet surface (upper strata) or between the sheet and the yarn knuckle. When the sheet is then removed from a dryer fabric surface, this steam is locally "violently" released causing sheet surface disruption which can cause problems such as dusting. On the other hand, where the flat yarn is grooved according to the present invention, there is a place for the heat and/or steam to vent so to prevent this localized disruption.

In addition to exhibiting increased venting of moisture, fabrics woven partially or completely with the grooved monofilaments 10 demonstrate improved air handling, as compared to prior art monofilaments with circular cross sections. Advantageously, the grooves 14 of the inventive monofilaments 10 provide channels for the air passing over the fabric. In connection with this feature, the cross sectional shape of the grooves 14 need not necessarily be one that mechanically locks with a coating. As a further benefit, the grooves 14 increase the void volume of the fabric without increasing its caliper (thickness). This feature is particularly advantageous in single-run configurations on papermaking machines.

In addition, wide flat grooved monofilaments 10 demonstrate reduced sheet marking, as compared with wide, flat ungrooved yarns. For example, in the case of a wide yarn 10 having three or four "key-way" grooves 14 as shown in FIG. 5(*g*), a sheet surface (not shown) is in effect "seeing" a series of smaller yarns with spaces between, so a reduced (or eliminated) chance of marking is provided.

Finally, advantages are provided by a fabric having the inventive grooved yarns in both the MD and CD directions, as compared to prior art fabrics with conventional yarns. These advantages include a thinner fabric; lower permeability; greater stability; improved sheet contact; and elimination of places for contamination, debris or dust to be trapped at yarn crossovers.

Modifications to the above would be obvious to those of ordinary skill in the art, but would not bring the invention so modified beyond the scope of the present invention. The claims to follow should be construed to cover such situations.

We claim:

1. A papermaking fabric or an engineered fabric for use in the production of paper or nonwovens, said fabric comprising:
    a plurality of functional square or rectangular monofilaments having a substantially flat cross-section,
    wherein the functional square or rectangular monofilaments have a top surface and a bottom surface, the top surface and the bottom surface have a plurality of grooves formed thereon, and the grooves formed in the top surface and the grooves formed in the bottom surface, which are offset without overlapping each other, are wider below the surface of the monofilament than at the grooves' open tops,
    wherein a shape of each of the plurality of grooves that are wider below the surface of the monofilament than at the grooves' open tops provides a mechanical interlock for a fabric coating.

2. The fabric of claim 1 wherein the top and bottom surface of each respective monofilament has a plurality of grooves formed thereon.

3. The fabric of claim 1 wherein the groove's cross sectional shape is one of a key-way shaped, C-shaped, or trapezoidal.

4. The fabric of claim 1 wherein each groove has an open angle less than 180 degrees.

5. The fabric of claim 1 wherein the fabric is a forming, press, dryer, TAD, pulp forming, sludge filter, chemiwasher, or engineered fabric.

6. The fabric of claim 1 wherein the fabric is a spiral link fabric comprising the plurality of functional monofilaments.

7. The spiral link fabric of claim 6 wherein the plurality of grooves is formed on a surface of each respective spiral link.

8. The spiral link fabric of claim 7 wherein each groove is C-shaped.

9. The spiral link fabric of claim 7 wherein each groove has an open angle less than 180 degrees.

10. The spiral link fabric of claim 6 wherein the groove's cross-sectional shape is one of a key-way shaped, C-shaped, or trapezoidal.

11. The spiral link fabric of claim 10 wherein each groove is C-shaped.

12. The spiral link fabric of claim 6 wherein the spiral link is made from one of polyester, polyamide, poly(phenylene sulfide), polyetherether-ketone, poly(aryl ether ketone), polyethylene, polypropylene or metal.

13. The spiral link fabric of claim 6 wherein each groove has an open angle less than 180 degrees.

14. The spiral link fabric of claim 6 wherein coating adhesion is improved.

15. A papermaking fabric or an engineered fabric for use in the production of paper or nonwovens, said fabric comprising:
    a plurality of functional square or rectangular monofilaments, said monofilaments having a substantially flat cross-sectional shape,
    wherein the functional square or rectangular monofilaments have a top surface and a bottom surface, the top surface and the bottom surface have one or more longitudinal grooves formed thereon, and the grooves formed in the top surface and the grooves formed in the bottom surface, which are offset without overlapping each other, are wider below the surface of the monofilament than at the grooves' open tops, wherein a shape of each of the plurality of grooves that are wider below the surface of the monofilament than at the grooves' open tops provides a mechanical interlock for a fabric coating, and wherein said fabric exhibits improved air handling compared with a fabric having round ungrooved monofilaments.

16. The fabric of claim 15 wherein the grooves in the monofilaments channel air passing over the fabric.

17. The fabric of claim 15 wherein the grooves in the monofilaments increase a void volume of the fabric without increasing the fabric's caliper.

18. The fabric of claim 15 wherein the cross sectional shape of the grooves in the monofilaments is one which provides the fabric with an air handling capacity.

19. The fabric of claim 15, wherein the grooved monofilaments are incorporated as both MD yarns and CD yarns, said fabric exhibiting a thinner caliper, reduced permeability, greater stability, improved sheet contact, and reduced dusting, as compared with a fabric not having said configuration.

20. The fabric of claim 15 wherein said grooves in the monofilaments provide venting of moisture at a point of contact between the monofilaments and a sheet on the fabric.

21. The fabric of claim 15 wherein the fabric is a forming, press, dryer, TAD, pulp forming, sludge filter, chemiwasher, or engineered fabric.

22. The fabric of claim 15 wherein the groove's cross sectional shape is one of a key-way shaped, C-shaped, or trapezoidal.

23. The fabric of claim 15 wherein the monofilament is square or rectangular in shape with a top surface having a different profile than a bottom surface.

24. The fabric of claim 15 wherein the grooved monofilament is made from one of polyester, polyamide, poly(phenylene sulfide), polyetherether-ketone, poly(aryl ether ketone), polyethylene, polypropylene and metal.

25. The fabric of claim 15 wherein the grooved monofilament is made by die extrusion.

26. A fabric comprising a plurality of square or rectangular monofilaments, said monofilaments having a substantially flat cross-section, wherein the functional square or rectangular monofilaments have a top surface and a bottom surface, the top surface and the bottom surface of said monofilaments have one or more longitudinal grooves formed thereon, wherein the groove(s) formed in the top surface of the monofilaments and the groove(s) formed in the bottom surface of the monofilaments, which are offset without overlapping each other, are wider below the surface of the monofilament than at the grooves' open tops, and wherein a shape of each of the plurality of grooves that are wider below the surface of the monofilament than at the grooves' open tops provides a mechanical interlock for a fabric coating.

* * * * *